Patented Oct. 1, 1946

2,408,519

UNITED STATES PATENT OFFICE 2,408,519

MANUFACTURE OF 4-KETO-TETRAHYDROTHIOPHENES

Anthony William d'Aubigny Avison, Franz Bergel, and John Wynne Haworth, Welwyn Garden City, England, assignors to Roche Products Limited, Welwyn Garden City, England No Drawing. Application July 7, 1944, Serial No. 543,768. In Great Britain July 6, 1943

3 Claims. (Cl. 260—329)

This invention relates to the manufacture of cyclic ketones of the tetrahydrothiophene series. It is known that tetrahydrothiophenes may be prepared by reacting the requisite 1,4-dihalogeno-paraffin with alkali metal sulphides (von Braun and Trümpler, Ber. 43, 1910, p. 549; Grischke-witsch-Trochimowski, Journ. Phys. Chem. Russia, 48, 1923, p. 901), the reaction usually being carried out in aqueous alcohol or wet ether.

The present invention provides a process for the manufacture of the hitherto unknown 4-keto-tetrahydrothiophenes carrying substituents in the 2-position by reacting $\alpha\beta'$-di-halogeno-ketones with metal sulphides. The course of the reaction is illustrated by the following formulae:

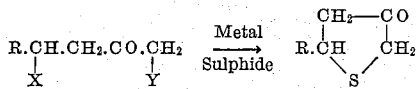

where R is an alkyl or substituted alkyl, aryl or fatty acid or fatty acid ester group and X and Y are halogen atoms.

It has been found especially advantageous to work under anhydrous conditions. In this way losses due to the rather unstable dihalogeno-ketone are considerably reduced.

The compounds prepared according to the above process can be used as intermediates in the preparation of biologically active substances.

The following examples in which the parts are by weight illustrate the manner in which the invention may be carried into effect.

Example I 8 parts of chloromethyl β-bromobutylketone (prepared by treating β-bromo-valeric acid chloride with two molecular proportions of diazomethane and decomposing the resulting diazoketone with one molecular proportion of HCl in an analogous manner to that described by Bradley and Schwartzenbach, Journal of the Chemical Society, 1928; p. 2904. It is a colourless lachrymatory oil b. pt. 85–90° C./12 mm.) are mixed with 5 parts of anhydrous sodium sulphide in 50 parts of benzene and refluxed gently for six hours. The unreacted sodium sulphide and the sodium chloride which is produced are filtered off and the benzene is removed from the filtrate by fractionating under ordinary pressure with a short column. The residue is distilled in vacuo and consists of 2-ethyl-4-keto-tetrahydrothiophene which is a colourless, rather sweet smelling oil, b. pt. 72–73° C./12 mm.

Example II 8 parts of chloromethyl β-bromobutyl ketone is dropped into 5 parts of anhydrous sodium sulphide in 50 parts of absolute ethyl alcohol. Heat is evolved and sodium chloride separates. After standing at room temperature overnight, the solution is filtered and poured into very dilute aqueous acetic acid. The oil which separates is extracted with ether and the ethereal solution washed with sodium bicarbonate solution and dried over anhydrous sodium sulphate. After evaporating the ether, the 2-ethyl-4-ketotetrahydrothiophene is distilled in vacuo.

Example III 14 parts of sodium sulphide nonahydrate are dissolved in 40 parts of water and added dropwise to 11.5 parts of chlormethyl β-bromopropyl ketone (conveniently prepared as a colourless, lachrymatory oil b. pt. 92–95° C./17 mm. from β-bromobutyryl chloride in an analogous manner to that described in Example I for chlormethyl β-bromobutyl ketone). Nitrogen may be bubbled through the solution with advantage. Slight heat is evolved and, on standing overnight, the solution becomes orange coloured and sodium chloride is precipitated. The solution is poured into water and extracted with ether. The ether layer is washed first with dilute sulphuric acid and then with aqueous sodium bicarbonate and dried over anhydrous sodium sulphate.

On evaporation and distillation of the residue under reduced pressure, 2-methyl-4-keto-tetrahydrothiophene is obtained as a colourless oil as a fraction b. pt. 60–70° C./12 mm. (semicarbazone m. pt. 174° C.).

We claim:
1. A process for the manufacture of 4-keto-tetrahydrothiophenes of the general formulae:

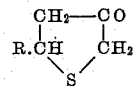

which comprises reacting α-β'-dihalogeno-ketones of the general formula:

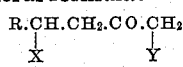

wherein R is selected from the group consisting of alkyl, substituted alkyl, aryl, fatty acid and fatty acid ester groups, and X and Y are halogen atoms, with metal sulphides.

2. A process as claimed in claim 1 wherein the reaction is carried out under anhydrous conditions.

3. 4-keto-tetrahydrothiophenes carrying substituents in the 2-position selected from the group consisting of alkyl, substituted-alkyl, aryl, fatty acid and fatty acid ester groups.

ANTHONY WILLIAM D'AUBIGNY AVISON.
FRANZ BERGEL.
JOHN WYNNE HAWORTH.